United States Patent [19]

Hickey

[11] Patent Number: 4,974,633
[45] Date of Patent: Dec. 4, 1990

[54] SYSTEM FOR CONTROLLING THE FLOW OF A FLUID MEDIUM RELATIVE TO AN OBJECT

[76] Inventor: John J. Hickey, 27 Bowdoin St., Apt. 4A, Boston, Mass. 02114

[21] Appl. No.: 454,026

[22] Filed: Dec. 19, 1989

[51] Int. Cl.$^5$ .............................................. F15B 1/00
[52] U.S. Cl. ............................. 137/561 R; 415/914; 416/235
[58] Field of Search .................. 137/561 R; 415/914; 416/235

[56] References Cited

U.S. PATENT DOCUMENTS

| | | | |
|---|---|---|---|
| 218,438 | 7/1866 | Heath | 416/231 R |
| 265,984 | 10/1882 | Schmolz | 416/235 |
| 1,131,997 | 7/1930 | Neal | 415/76 |
| 1,861,065 | 5/1932 | Poot | 416/235 |
| 1,903,823 | 4/1933 | Loughead | 244/130 |
| 2,238,749 | 4/1941 | Peltier | 416/235 |
| 2,333,555 | 11/1943 | Prucha | 416/235 |
| 3,463,418 | 8/1969 | Miksch | 244/17.11 |
| 3,612,446 | 10/1971 | Lebert | 244/200 |

FOREIGN PATENT DOCUMENTS

| | | | |
|---|---|---|---|
| 164590 | 12/1980 | Japan | 416/235 |
| 15510 | 12/1908 | United Kingdom | 416/236 |

OTHER PUBLICATIONS

Hyde, Vicki, Wind Engineering Technology Also Saves Oil and Cuts Pollution at Sea, *Windpower Monthly*, Mar. 1988, pp.23–24.

Schefter, Jim, Barrel-Blade Windmill-Efficient Power from the Magnus Effect?, *Popular Science*, Aug. 1983, pp. 60–63.

Spin Sail Harnesses Mysterious Magnus Effect for Ship Propulsion, C. P. Gilmore, *Popular Science*, Jan. 1984, pp. 70–73.

A. Mauric and J. C. Nahon, Article Entitled The Turbosail System Circulated by The Cousteau Society.

Fondation Cousteau (FC)/The Cousteau Society (TCS)/Nov. 1985, Constans, Jacques, A.; Alcyone, Daughter of the Wind the Ship of the Future, Regional Conference on Sail-Motor Propulsion.

*Primary Examiner*—A. Michael Chambers
*Attorney, Agent, or Firm*—Weingarten, Schurgin, Gagnebin & Hayes

[57] ABSTRACT

A system for affecting the flow of a fluid medium relative to an object including a first plurality of surface deviations disposed on the surface of the object in contact with the fluid medium. The deviations are arranged into at least one predetermined pattern which includes a plurality of radially extending deviation sets. A second plurality of surface deviations are disposed on at least one of the first plurality of surface deviations. The second plurality of surface deviations are arranged in a second predetermined pattern which includes a plurality of radially extending deviation sets. The deviations may be indentations or projections from the surface.

16 Claims, 5 Drawing Sheets

SYSTEM FOR CONTROLLING THE FLOW OF A FLUID MEDIUM RELATIVE TO AN OBJECT

FIELD OF THE INVENTION

This invention relates to a system for controlling the flow of a fluid medium and more particularly, to a number of deviations arranged in a predetermined pattern on the surface of an object for affecting the flow of a fluid medium relative to the object.

BACKGROUND OF THE INVENTION

An object designed for smooth and efficient movement relative to a fluid medium such as air or water faces an obstacle called surface drag. As the object moves relative to the medium, its surface tends to tow along with in a sheath of air or water adjacent to the object's surface. This sheath, which envelopes the object's surface, tows along with it successive envelopes of air or water which ultimately create a near vacuum as the laminar flow of the medium leaves the object. This vacuum acts as a drag on the object's movement relative to the medium, tending to reduce the object's speed or decrease its drive capability.

Prior art attempts at solving this problem have all been confined to placing uniformly shaped, sized, and spaced surface deviations over the entire surface of an object that contacts the fluid medium. These attempts, however, have failed to consider the fact that fluid mediums often contact and flow from an object with a spiral or vortex like motion. In addition, placing surface deviations over the entire surface of an object can be costly, as well as time-consuming.

SUMMARY OF THE INVENTION

This invention features a system for affecting the flow of a fluid medium relative to an object. There is at least one surface of the object in contact with the fluid medium and on the surface are located a first plurality of surface deviations which are arranged in at least one first predetermined pattern. The first predetermined pattern includes a plurality of radially extending deviation sets. A second plurality of surface deviations are disposed on at least one of the first plurality of surface deviations. The second plurality of surface deviations are arranged in a second predetermined pattern which includes a plurality of radially extending deviation sets.

In a preferred embodiment, at least one of the first or second plurality of deviations are concave indentations in the surface and the deviation sets are grouped in a pattern which defines a generally spiral form having a common central deviation from which the deviation sets radiate. The deviations may be equal in size or may be of varying sizes. The radial deviation sets may curve in a clockwise or counterclockwise direction. Alternatively, the deviations may include projections from the surface of the object.

DESCRIPTION OF THE DRAWING

Other objects, features, and advantages will occur from the following description of a preferred embodiment and the accompanying drawings, in which.

DETAILED DESCRIPTION OF THE INVENTION

Figure 1:
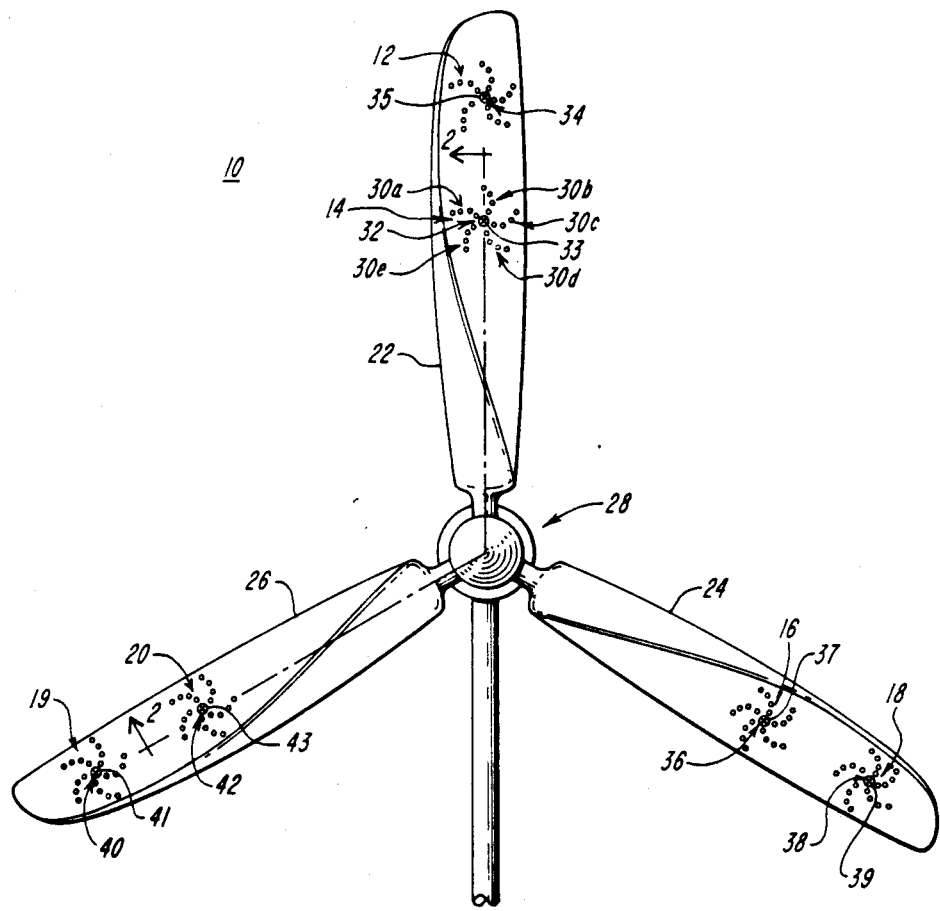
FIG. 1 is a front view of a wind turbine on whose blades are disposed a plurality of surface deviations according to the present invention.

System 10, FIG. 1, for controlling the flow of a fluid medium such as air according to the present invention includes a plurality of spiral patterns of flow altering surface deviations 12-20 located on blades 22-26 of wind turbine 28. Each surface deviation pattern includes a central deviation from which radiate a plurality of deviation sets. For example, deviation pattern 14 includes deviation sets 30a-30e which radiate from central deviation 32. Disposed on at least one deviation from among the first surface deviations is a second plurality of surface deviations such as deviation pattern 33 disposed on central deviation 32 of deviation pattern 14. Similarly, a second plurality of surface deviations 35, 39, 41 and 43 are also disposed on central deviations 34-42 of first deviation patterns 12 and 16-20.

Figure 2:
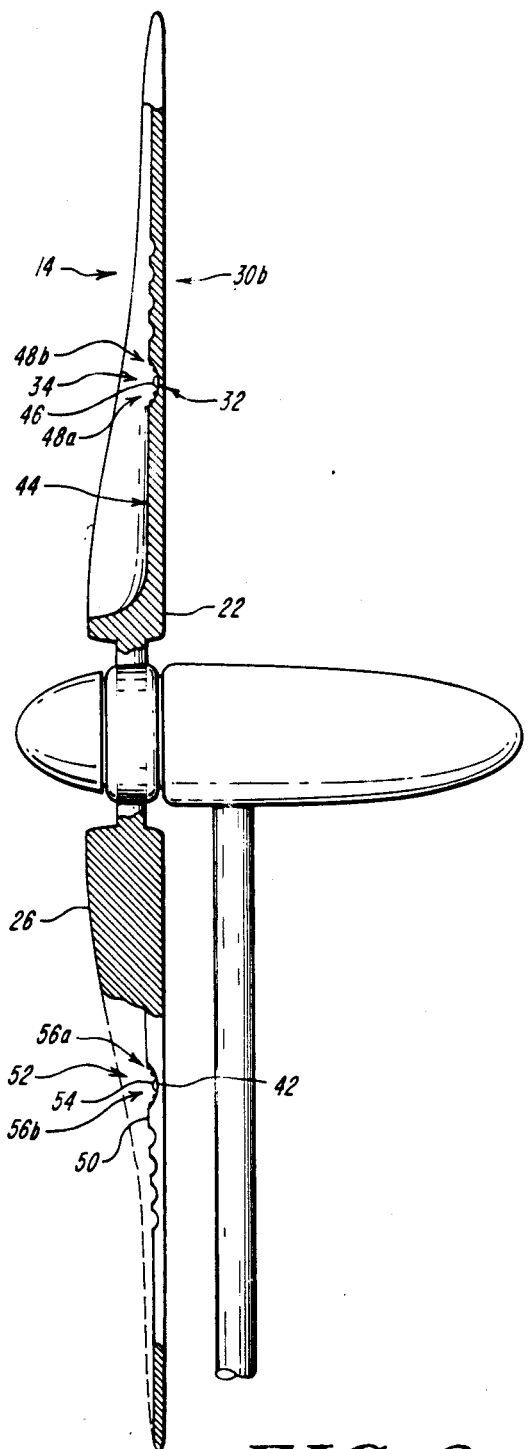
FIG. 2 is a side view of the wind turbine taken along lines 2—2 of FIG. 1.

First deviation pattern 14, FIG. 2 disposed on wind turbine blade 22 includes central deviation 32 and deviation set 30b which are depressions or indentations in surface 44 of wind turbine blade 22. Disposed on central deviation 32 is second deviation pattern 34 comprised in part of central deviation 46 and radiating deviation sets 48a and 48b. The deviations of second deviation pattern 34 are shown as projections from the surface of central deviation 32. Central deviation 42, a concave indentation in surface 50 of wind turbine blade 26 also includes second deviation pattern 52 which includes central projection 54 and radiating projection sets 56a and 56b.

Figure 3:
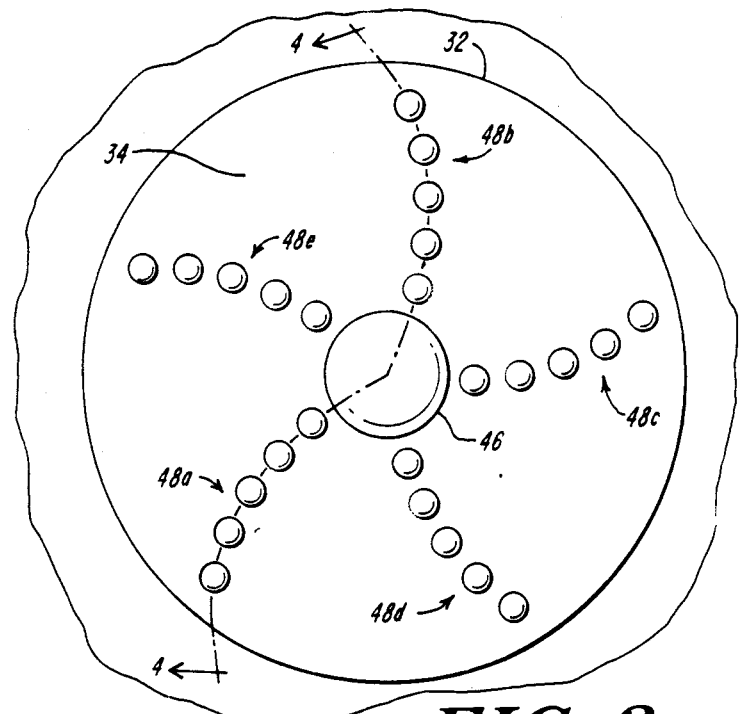
FIG. 3 is a schematic representation of a first surface deviation on which is disposed a plurality of second surface deviations arranged in a radial pattern according to the present invention.

Shown in greater detail in FIG. 3, a first deviation such as first central deviation 32 includes second deviation set 34 comprising of second central deviation 46 from which radiate 10 deviation sets 48a–48e.

Figure 4:
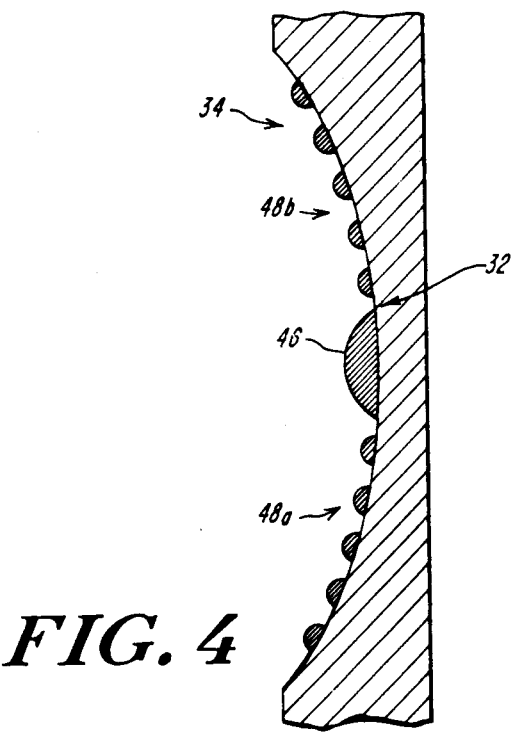
FIG. 4 is a cross section of the first and second surface deviations taken along line 4—4 of FIG. 3.

First central deviation 32 shown in cross section in FIG. 4, is a concave indention on which is disposed a plurality of protruding deviations such as central deviation 46 and deviation sets 48a and 48b which form part of second deviation pattern 34.

Figure 5:
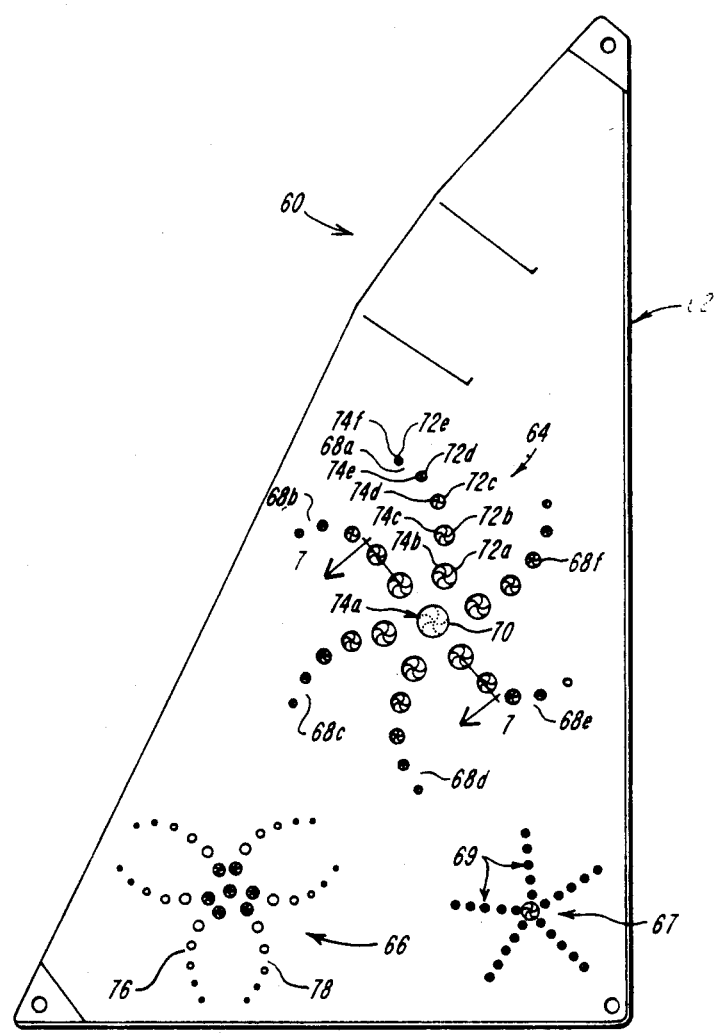
FIG. 5 is an axonometric view of a plurality of surface deviations arranged in a spiral pattern according to the present invention, and disposed on a thin, flexible, sheet-like surface.

System 60, FIG. 5, for controlling the flow of air contacting an object such as sail 62 includes spirallY formed flow altering deviation patterns 64 and 66 and radially formed deviation pattern 67. Spirally formed pattern 64 is comprised of curvilinear deviation sets 68a–68f which radiate from common central deviation 70. Each surface deviation from among the first plurality of deviations, such as central deviation 70 and deviations 72a–72e, include second deviation patterns 74a–74f. The first plurality of deviations which form deviation pattern 64 may be unequal in size with central deviation 70 larger than deviation 72a, and larger again than deviation 72b. Whereas deviation sets 68a–68f have generally the same shape and radiate in only the counter-clockwise direction, surface deviation pattern 66 includes deviation sets 76 and 78 which radiate in a counter-clockwise and clockwise direction, respectively. Deviation pattern 67 includes radially extending generally non-curvilinear deviation sets 69.

Figure 6:
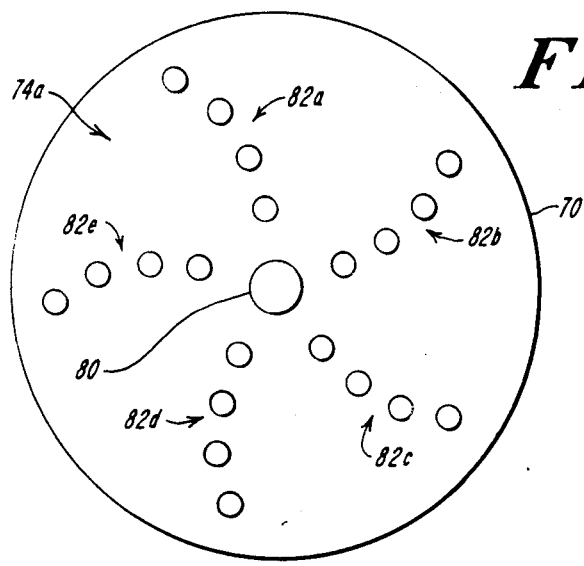
FIG. 6 is a schematic representation of a first surface deviation on which are disposed a plurality of second surface deviations arranged in a spiral pattern.

First central deviation 70 shown more clearly in FIG. 6, includes second spiral deviation pattern 74a. Second spiral deviation pattern 74a includes central deviation 80 from which radiate curvilinear deviation sets 82a-82e.

Figure 7:
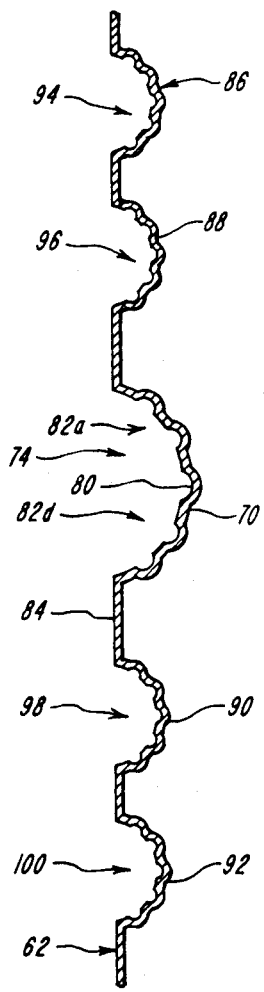
FIG. 7 is a cross sectional view of first and second deviations taken along line 7—7 of FIG. 5.

In certain circumstances, it is desired to provide both the first and second deviation patterns as indentations in the surface which is in contact with the flow of a fluid medium. Sail 62, illustrated in cross section in FIG. 7, includes first central deviation 70 which is a concave indentation in surface 84 of sail 62. First central indentation 70 also includes second deviation pattern 74, which is also a plurality of indentations in the surface of sail 62. Second deviation pattern 74 includes second central deviation 80 and spirally formed radially extending indentation sets 82a and 82d. First deviations 86-92 are also provided with second deviation patterns 94-100 respectively.

Modifications and substitutions of the present invention by one of ordinary skill in the art are considered to be within the scope of the present invention and the claims which follow.

I claim:

1. A system for controlling the flow of a fluid medium relative to an object, said object having at least one surface in contact with the fluid medium, comprising:
   a first plurality of surface deviations disposed on said surface in contact with said fluid medium, said first plurality of surface deviations arranged in at least one first predetermined pattern, said first predetermined pattern including a first plurality of radially extending deviation sets; and
   a second plurality of surface deviations, disposed on at least one of said first plurality of surface deviations, said second plurality of surface deviations arranged in at least one second predetermined pattern, said second predetermined pattern including a second plurality of radially extending deviation sets.

2. The system of claim 1 wherein said first predetermined pattern further includes a common central deviation from which extend said plurality of radially extending deviation sets.

3. The system of claim 1 wherein said second predetermined pattern further includes a common central deviation from which extend said plurality of radially extending deviation sets.

4. The system of claim 1 wherein said radially extending deviation sets are curvilinear.

5. The system of claim 4 wherein said curvilinear deviation sets radiate in a counterclockwise direction.

6. The system of claim 4 wherein said curvilinear deviation sets radiate in a clockwise direction.

7. The system of claim 1 wherein said surface deviations are concave indentations in said surface.

8. The system of claim 1 wherein said surface deviations are projections from said surface.

9. The system of claim 1 wherein said surface deviations include both projections from said surface and concave indentations in said surface.

10. The system of claim 1 wherein said deviations are of equal size.

11. The system of claim 1 wherein deviations are of varying size

12. The system of claim 1 further including a plurality of said first and second deviation patterns.

13. A system for effecting the flow of the fluid medium, relative to an object, said object having at least one surface in contact with the fluid medium, comprising:
   a first plurality of surface deviations disposed on said surface in contact with said fluid medium, said first plurality of surface deviations arranged in at least one first predetermined pattern, said first predetermined pattern including a common central deviation from which radially extend a first plurality of deviation sets; and
   a second plurality of surface deviations disposed on at least one of said first plurality of surface deviations, said second plurality of surface deviations arranged in at least one second predetermined pattern, said second predetermined pattern including a common central deviation from which radially extend a second plurality of deviation sets.

14. The system of claim 13 wherein said radially extending deviation sets are equally spaced around said common central deviation.

15. A system for effecting the flow of a fluid medium relative to an object, said object having at least one surface in contact with the fluid medium, comprising:
   a first plurality of concave surface deviations disposed on said at least one surface in contact with said fluid medium, said first plurality of concave surface deviations arranged in a first predetermined pattern, said first predetermined pattern defining a generally spiral form having a common central deviation from which radially extend a first plurality of curvilinear deviation sets; and
   a second plurality of surface deviations disposed on at least one of said first plurality of concave surface deviations, said second plurality of surface deviations arranged in a second predetermined pattern defining a generally spiral form having a common central deviation from which radially extend a second plurality of curvilinear deviation sets.

16. The system of claim 15 further including a plurality of said spirally shaped first and second deviation patterns.

* * * * *